United States Patent
Dry et al.

(10) Patent No.: US 10,625,704 B2
(45) Date of Patent: Apr. 21, 2020

(54) VEHICLE INCLUDING INFLATABLE ASSEMBLY SUPPORTED BY SEAT

(71) Applicant: Ford Global Technologies, LLC, Dearborn, MI (US)

(72) Inventors: Alan George Dry, Grosse Pointe Woods, MI (US); Brian Robert Spahn, Plymouth, MI (US); Johnathan Andrew Line, Northville, MI (US); Benjamin Yilma, Canton, MI (US); S. M. Akbar Berry, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 215 days.

(21) Appl. No.: 15/864,686

(22) Filed: Jan. 8, 2018

(65) Prior Publication Data
US 2019/0071046 A1   Mar. 7, 2019

Related U.S. Application Data

(60) Provisional application No. 62/553,684, filed on Sep. 1, 2017.

(51) Int. Cl.
*B60R 21/232* (2011.01)
*B60R 21/216* (2011.01)
*B60R 21/231* (2011.01)
(Continued)

(52) U.S. Cl.
CPC ............. *B60R 21/232* (2013.01); *B60N 2/14* (2013.01); *B60R 21/013* (2013.01); *B60R 21/207* (2013.01); *B60R 21/216* (2013.01); *B60R 21/231* (2013.01); *B60R 21/233* (2013.01); *B60R 21/2338* (2013.01);
(Continued)

(58) Field of Classification Search
CPC ............... B60R 21/232; B60R 21/216; B60R 21/23138; B60R 21/233; B60R 21/2338; B60R 21/013; B60R 21/2342; B60R 21/207; B60R 2021/01231; B60R 2021/2163; B60R 2021/23146; B60R 2021/23308; B60R 2021/23316; B60R 2021/23386; B60R 2021/23107;
(Continued)

(56) References Cited

U.S. PATENT DOCUMENTS 3,218,103 A  *  11/1965  Boyce ..................... B60R 21/16
                                                            297/466
3,753,576 A  *   8/1973  Gorman ................ B60R 21/207
                                                            280/730.1

(Continued)

OTHER PUBLICATIONS

Volvocars.com—p. 21 of owners manual re Side impact protection (SIPS) airbags—2006 Volvo, http://new.volvocars.com/ownersdocs/2006/2006_S40/06s40_02b.htm, printed Sep. 27, 2017.

*Primary Examiner* — Frank B Vanaman
(74) *Attorney, Agent, or Firm* — Frank MacKenzie; Bejin Bieneman PLC (57) ABSTRACT

A vehicle seat assembly includes a seatback including a left lateral panel and a right lateral panel opposite the left lateral panel, a left airbag inflatable from the left lateral panel to an inflated position, a right airbag inflatable from the right lateral panel to an inflated position, and a tether extending from the left lateral panel to the right lateral panel. The tether is connected to the airbags.

20 Claims, 12 Drawing Sheets

(51) Int. Cl.
*B60R 21/233* (2006.01)
*B60R 21/2338* (2011.01)
*B60R 21/013* (2006.01)
*B60R 21/2342* (2011.01)
*B60R 21/207* (2006.01)
*B60N 2/14* (2006.01)
*B60R 21/01* (2006.01)
*B60R 21/26* (2011.01)

(52) U.S. Cl.
CPC .... *B60R 21/2342* (2013.01); *B60R 21/23138* (2013.01); *B60R 2021/01231* (2013.01); *B60R 2021/2074* (2013.01); *B60R 2021/2163* (2013.01); *B60R 2021/23107* (2013.01); *B60R 2021/23146* (2013.01); *B60R 2021/23308* (2013.01); *B60R 2021/23316* (2013.01); *B60R 2021/23386* (2013.01); *B60R 2021/26058* (2013.01)

(58) Field of Classification Search
CPC .. B60R 2021/2074; B60R 2021/26058; B60R 21/231; B60N 2/14
See application file for complete search history.

(56) References Cited

U.S. PATENT DOCUMENTS

| | | | |
|---|---|---|---|
| 5,431,433 | A | 7/1995 | Steimke et al. |
| 5,496,061 | A * | 3/1996 | Brown .................. B60R 21/207 280/730.2 |
| 5,499,840 | A * | 3/1996 | Nakano ................ B60N 2/0705 280/730.1 |
| 7,571,930 | B2 | 8/2009 | Osterhout et al. |
| 8,590,925 | B2 | 11/2013 | Kwon et al. |
| 9,126,560 | B2 | 9/2015 | Fujiwara |
| 2006/0290122 | A1 | 12/2006 | Woydick |
| 2007/0040368 | A1 | 2/2007 | Manley |
| 2013/0015642 | A1* | 1/2013 | Islam .................... B60R 21/207 280/730.1 |
| 2014/0300088 | A1* | 10/2014 | Fukawatase ............ B60R 21/13 280/729 |
| 2016/0272141 | A1* | 9/2016 | Ohmura .............. B60R 21/01554 |
| 2017/0259704 | A1* | 9/2017 | Madaras .............. B60N 2/0276 |
| 2017/0291569 | A1* | 10/2017 | Sugie ................ B60R 21/01552 |
| 2017/0334385 | A1* | 11/2017 | Sakakibara .............. B60N 2/68 |

\* cited by examiner

VEHICLE INCLUDING INFLATABLE ASSEMBLY SUPPORTED BY SEAT

CROSS-REFERENCE TO RELATED APPLICATIONS

The subject patent application claims priority to and all the benefits of U.S. Provisional Patent Application No. 62/553,684, which was filed on Sep. 1, 2017 and is hereby incorporated by reference in its entirety.

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

A vehicle seat assembly includes a seatback including a left lateral panel and a right lateral panel opposite the left lateral panel, a left airbag inflatable from the left lateral panel to an inflated position, a right airbag inflatable from the right lateral panel to an inflated position, and a tether extending from the left lateral panel to the right lateral panel. The tether is connected to the airbags.

The tether may be attached to the left lateral panel below the left airbag and to the right lateral panel below the right airbag.

The seatback may include a front panel extending from the left lateral panel to the right lateral panel, and the tether may extend across the front panel when the left airbag and the right airbag are in the inflated position.

The left airbag may be an upper left airbag, and the right airbag may be an upper right airbag. The vehicle seat assembly may further include a lower left airbag inflatable from the left lateral panel and disposed below the upper left airbag, and a lower right airbag inflatable from the right lateral panel and disposed below the upper right airbag. The upper left airbag and the lower left airbag may be sewn together, and the upper right airbag and the lower right airbag may be sewn together. The tether may be connected to the lower left airbag and the lower right airbag.

The seatback may include a top section, and the vehicle seat assembly may further include a top airbag inflatable from the top section forward relative to the seatback. The tether may be connected to the top airbag. The top airbag may be inflatable to an inflated position, and the vehicle seat assembly may further include a front airbag inflatable downward from the top airbag when the top airbag is in the inflated position. The top airbag may be fluidly connected to the front airbag.

The vehicle seat assembly may further include a container connected to one of the top airbag and the tether, and the front airbag may be inflatable from an uninflated position to an inflated position, and the front airbag in the uninflated position may be disposed in the container.

The tether may be a first tether, and the vehicle seat assembly may further include a second tether extending from the left lateral panel to the right lateral panel. The vehicle seat assembly may further include a hook fixed relative to the seatback, and the second tether may be movable from an undeployed position to a deployed position, and the second tether in the deployed position is engaged with the hook. The first tether and the second tether may be inflatable. The vehicle seat assembly may further include stitching connecting the first and second tether, and the stitching may be frangible as a result of inflation of the top airbag.

The vehicle seat assembly may further include a front-airbag inflator fluidly connected to the front airbag, at least one lateral-airbag inflator fluidly connected to the left airbag and the right airbag, and a controller communicatively coupled to the front-airbag inflator and the at least one lateral-airbag inflator, and the controller may be programmed to instruct the front-airbag inflator to inflate after instructing the at least one lateral-airbag inflator to inflate.

The tether may be inflatable. The left lateral panel and the right lateral panel each may include a seam extending along the tether and frangible from inflation of the tether. The vehicle seat assembly may further include a seat bottom coupled to the seatback, and a rotational mechanism coupled to the seat bottom and connectable to a floor, and the rotational mechanism may be rotatable about an axis transverse to the floor.

A vehicle may include a floor and a seat assembly, which includes a seat bottom, a seatback coupled to the seat bottom, a rotational mechanism coupled to the seat bottom and the floor and rotatable about an axis transverse to the floor, a left airbag, a right airbag, and a tether. The seatback includes a left lateral panel and a right lateral panel opposite the left lateral panel. The left airbag is inflatable from the left lateral panel to an inflated position. The right airbag is inflatable from the right lateral panel to an inflated position. The tether extends from the left lateral panel to the right lateral panel, and the tether is connected to the airbags.

With reference to the Figures, wherein like numerals indicate like parts throughout the several views, a vehicle 48 includes a vehicle seat assembly 10 including a seat 12 and an inflatable assembly 14 supported by the seat 12. The seat 12 includes a seat bottom 15 and a seatback 16 supported on the seat bottom 15. The inflatable assembly 14 inflates in front of the seatback 16 to retain an occupant in the seat 12 during a sudden deceleration of the vehicle 48, e.g., during a vehicle impact. The inflatable assembly 14 increases the likelihood that the occupant is retained in the seat 12 regardless of the direction of the impact and the direction the seat 12 faces. The inflatable assembly 14 also increases the likelihood that the occupant is retained in the seat 12 during a vehicle rollover.

Figure 1:
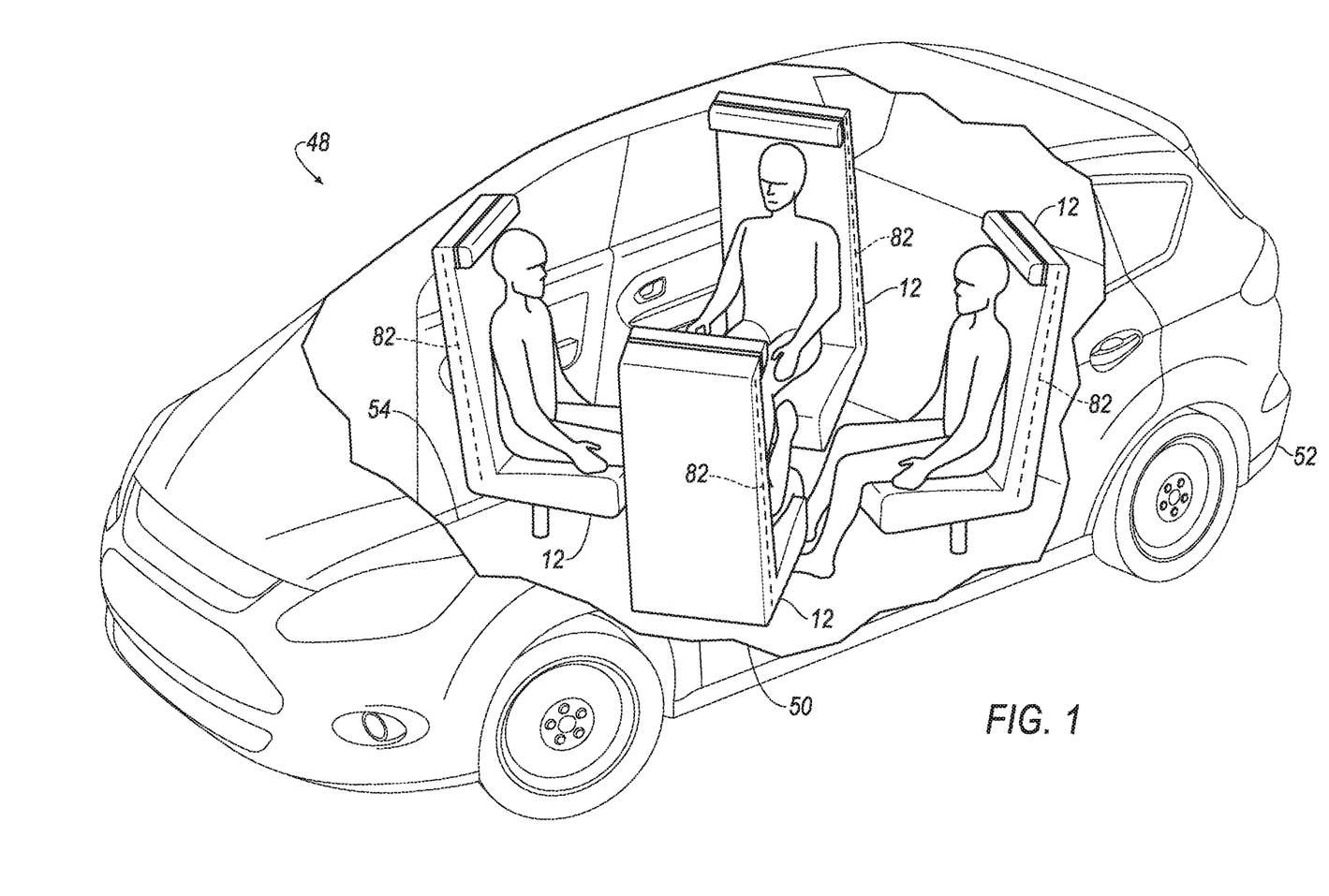
FIG. 1 is a perspective view of an example vehicle with a passenger cabin exposed for illustration.

With reference to FIG. 1, the vehicle 48 may be an autonomous vehicle. A computer (not shown) can be configured to operate the vehicle 48 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 48 includes a passenger cabin 50. The passenger cabin 50 houses occupants, if any, of the vehicle 48. The passenger cabin 50 may be surrounded and/or defined by a body 52 of the vehicle 48. A floor 54 may define a bottom of the passenger cabin 50.

The vehicle 48 may include one or more seats 12 for occupants of the vehicle 48. The seat 12 or seats 12 may be supported on the floor 54. In examples, where the vehicle 48 includes multiple seats 12, the seats 12 may be substantially identical. The seat 12 may be a bucket seat, as shown in the Figures, bench seat, or another type of seat. The seat 12 defines a front direction as a direction faced by an occupant sitting in the seat 12.

The floor 54 may rotatably support the seat 12 such that the seat 12 is rotatable about an axis transverse to the floor 54. For example, the seat 12 may be rotatably coupled to the floor 54 via a rotational mechanism 56 configured to rotatably support the seat 12 on the floor 54 of the vehicle 48 such that the seat 12 is rotatable about an axis transverse to the floor 54. The rotational mechanism 56, for example, may include a pedestal 58 connected to one of the seat 12 and the floor 54, and a bearing 60 connected to the other of the seat 12 and the floor 54 and rotatably receiving the pedestal 58. In examples where the vehicle 48 includes multiple seats 12, the seats 12 may each be rotatable relative to each other about a vertical axis relative to the passenger cabin 50. The seat 12 may face a vehicle-forward direction, a vehicle-rearward direction, or any direction in between. Whichever direction the seat 12 is facing is the forward direction relative to the seat 12.

With reference to FIGS. 2A-11B, the seatback 16 may be supported by the seat bottom 15 and may be stationary or movable relative to the seat bottom 15. For example, the seatback 16 may be raised and lowered relative to the seat bottom 15. The inflatable assembly 14 may be supported on the seatback 16 such that the inflatable assembly 14 is raised and lowered with the seatback 16 relative to the seat bottom 15. In addition, or in the alternative, the seatback 16 and/or the seat bottom 15 may be adjustable in multiple degrees of freedom relative to each other. Specifically, the seatback 16 and/or the seat bottom 15 may themselves be adjustable, in other words, have adjustable components within the seatback 16 and/or the seat bottom 15, and/or may be adjustable relative to each other. The seatback 16 includes a front panel 62 that the occupant contacts when sitting in the seat 12, a back panel 64 facing the opposite direction as the front panel 62, and a left lateral panel 66 and a right lateral panel 68 facing laterally and connecting the front panel 62 and the back panel 62. The right lateral panel 68 is disposed opposite the left lateral panel 66 and faces the opposite direction as the left lateral panel 66.

Figure 2A:
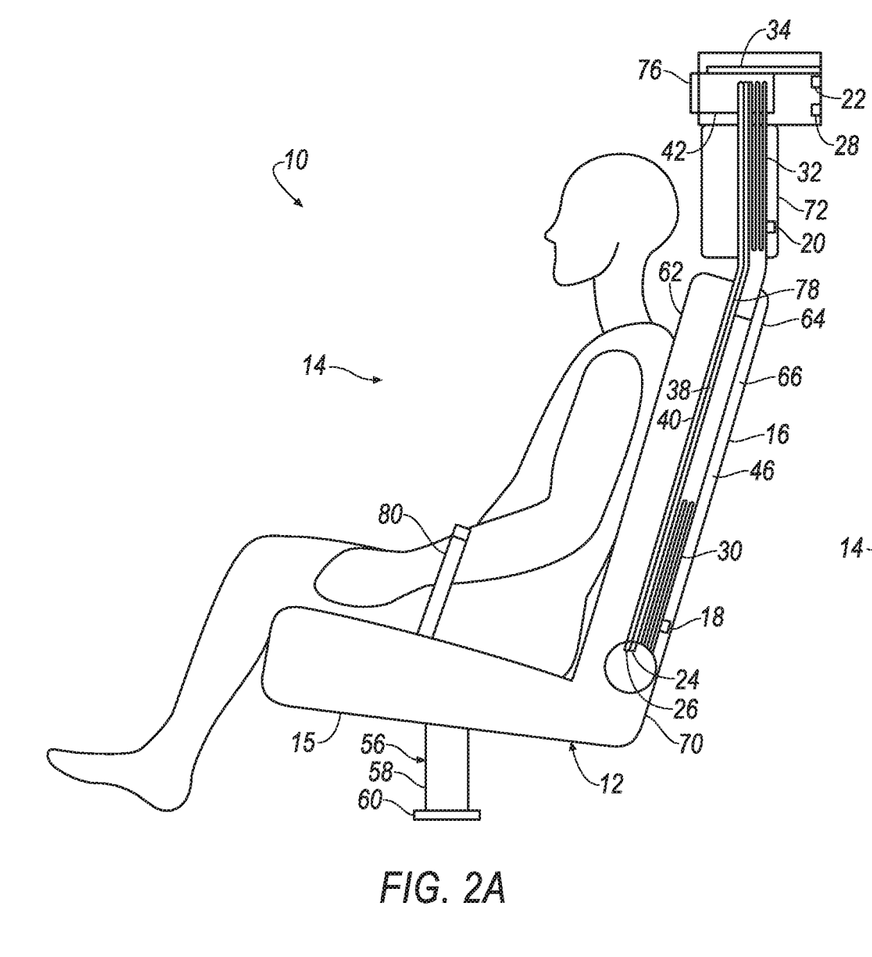
FIG. 2A is a side view of a seat of the vehicle with an example airbag assembly in an uninflated position.
Figure 2B:
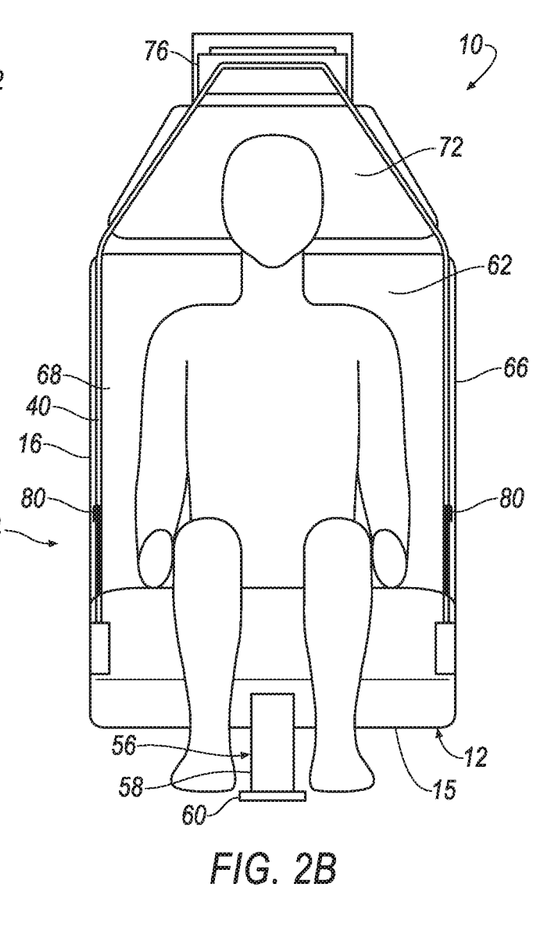
FIG. 2B is a front view of the seat with the airbag assembly of FIG. 2A in the uninflated position.
Figure 3A:
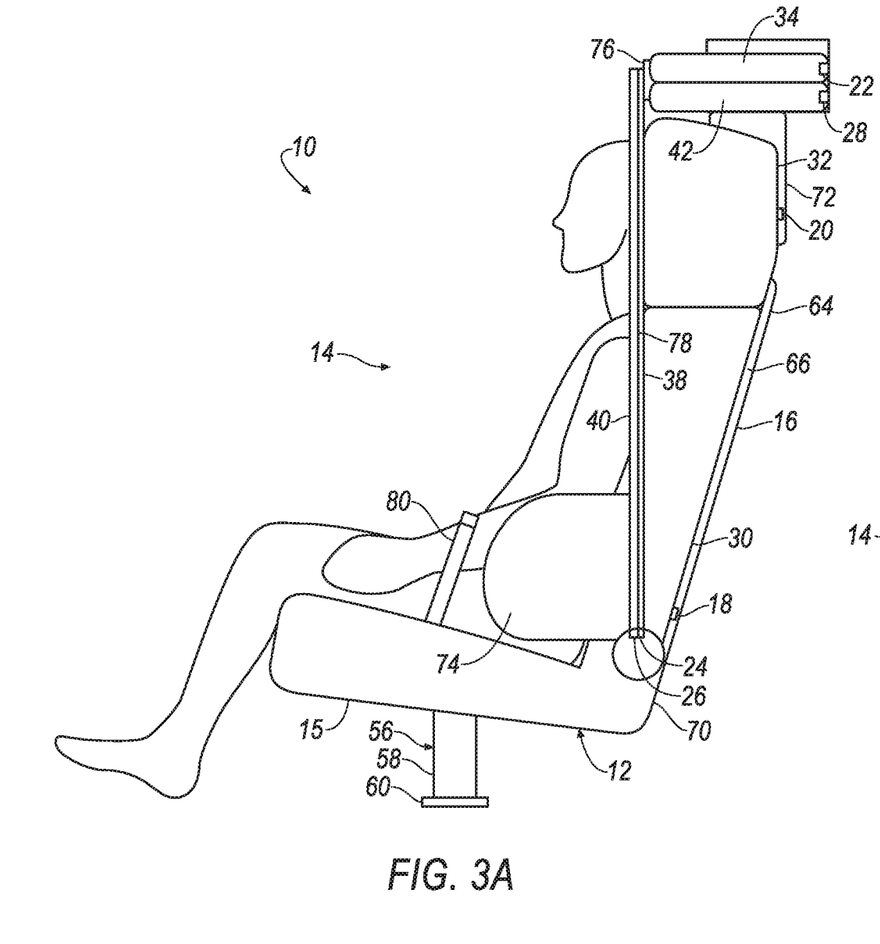
FIG. 3A is a side view of the seat with the airbag assembly of FIG. 2A in a partially inflated position.
Figure 3B:
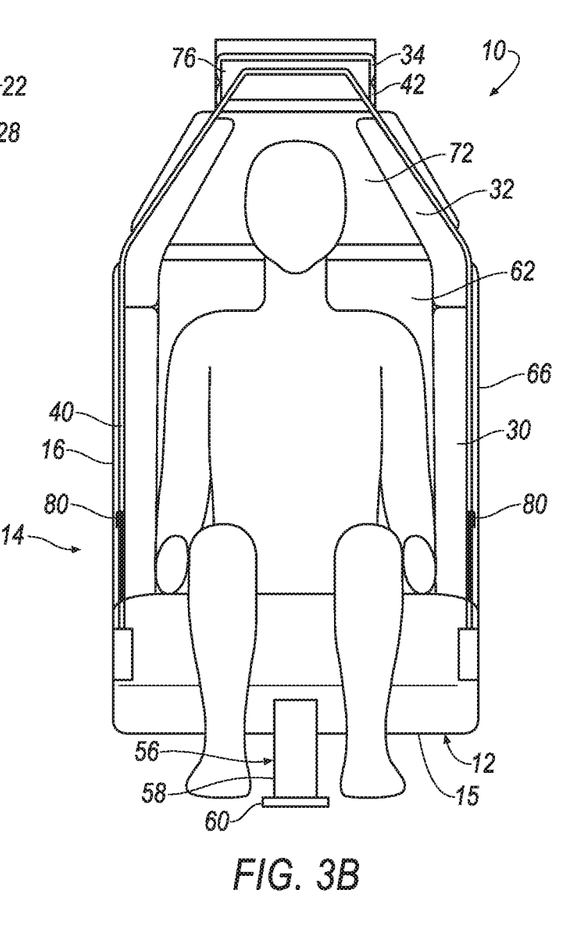
FIG. 3B is a front view of the seat with the airbag assembly of FIG. 2A in the partially inflated position.
Figure 4A:
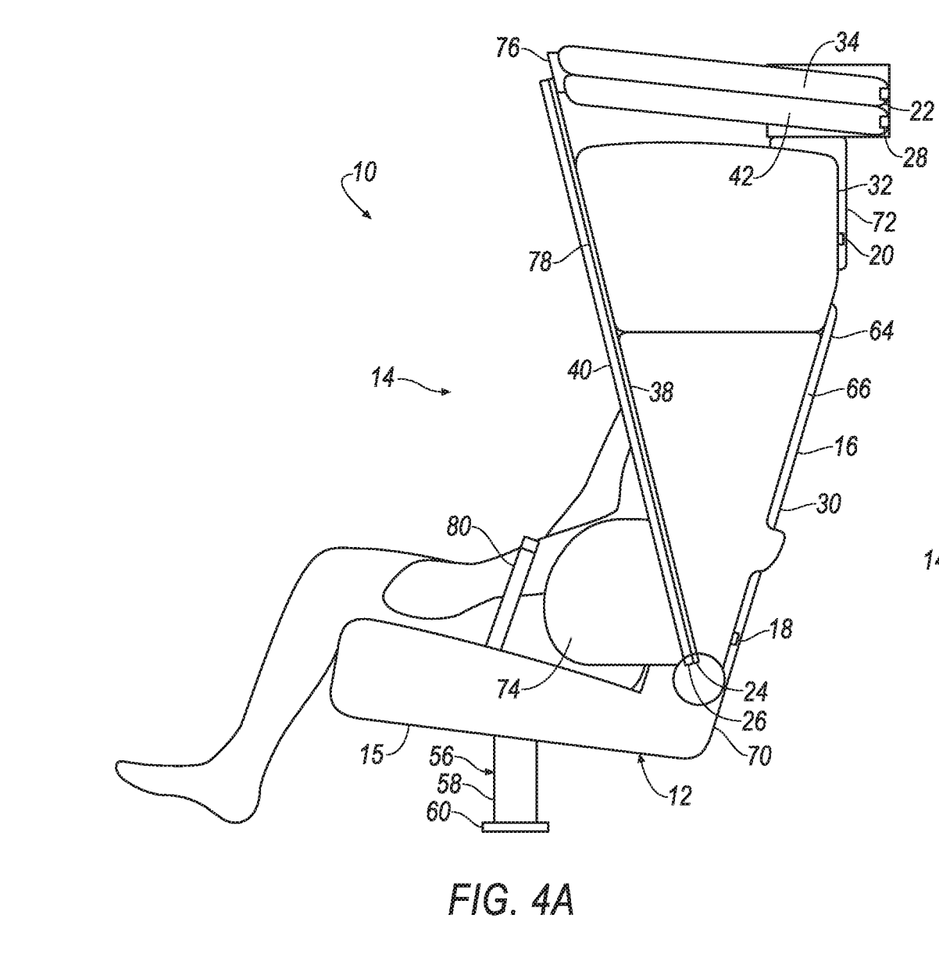
FIG. 4A is a side view of the seat with the airbag assembly of FIG. 2A further inflated relative to FIGS. 3A and 3B.
Figure 4B:
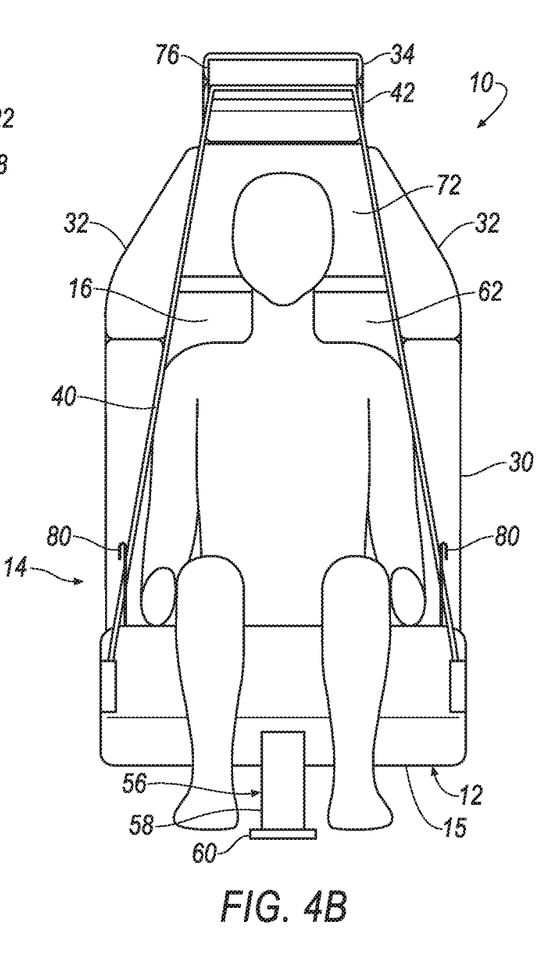
FIG. 4B is a front view of the seat with the airbag assembly of FIG. 2A further inflated relative to FIGS. 3A and 3B.
Figure 5A:
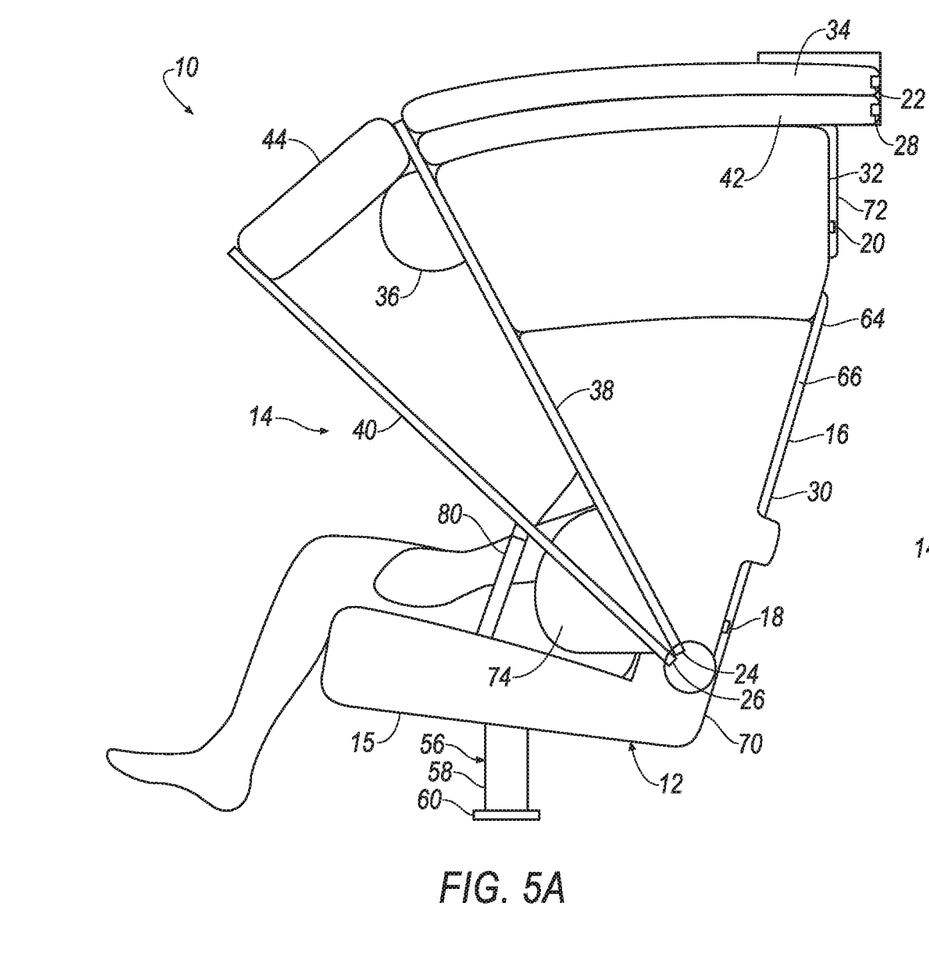
FIG. 5A is a side view of the seat with the airbag assembly of FIG. 2A further inflated relative to FIGS. 4A and 4B.
Figure 5B:
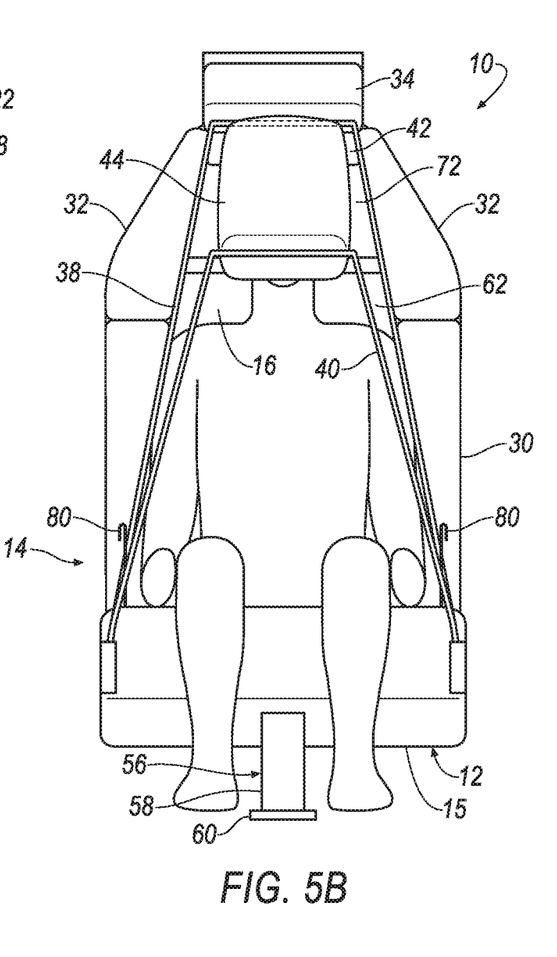
FIG. 5B is a front view of the seat with the airbag assembly of FIG. 2A further inflated relative to FIGS. 4A and 4B.
Figure 6A:
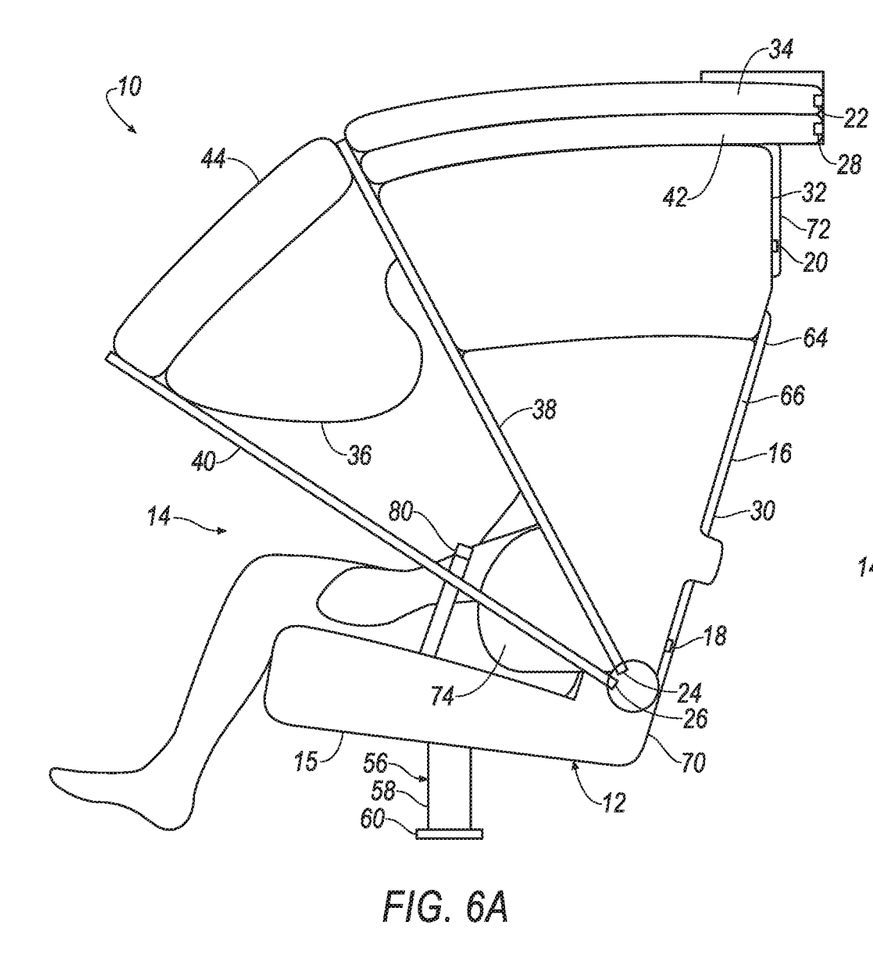
FIG. 6A is a side view of the seat with the airbag assembly of FIG. 2A further inflated relative to FIGS. 5A and 5B.
Figure 6B:
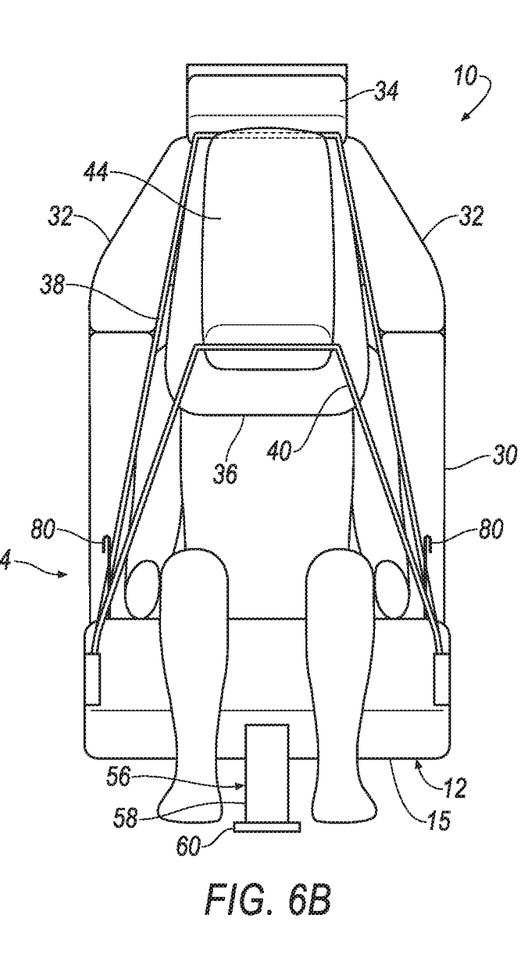
FIG. 6B is a front view of the seat with the airbag assembly of FIG. 2A further inflated relative to FIGS. 5A and 5B.
Figure 7A:
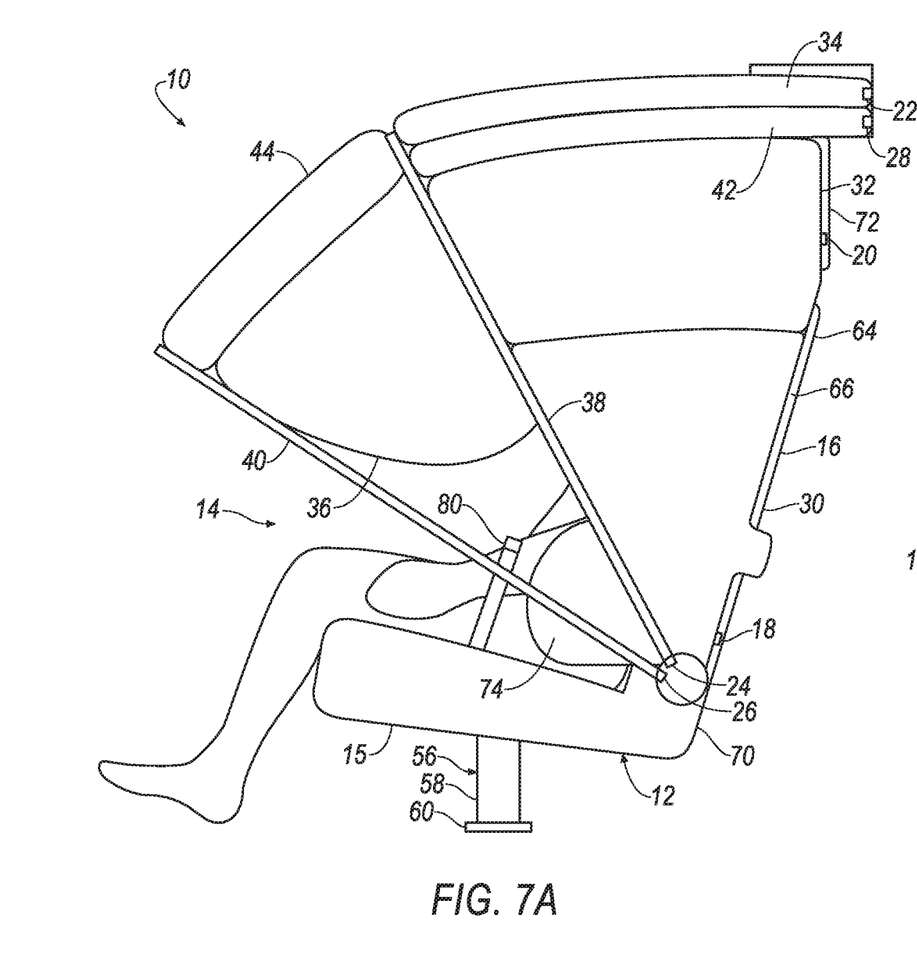
FIG. 7A is a side view of the seat with the airbag assembly of FIG. 2A further inflated relative to FIGS. 6A and 6B.
Figure 7B:
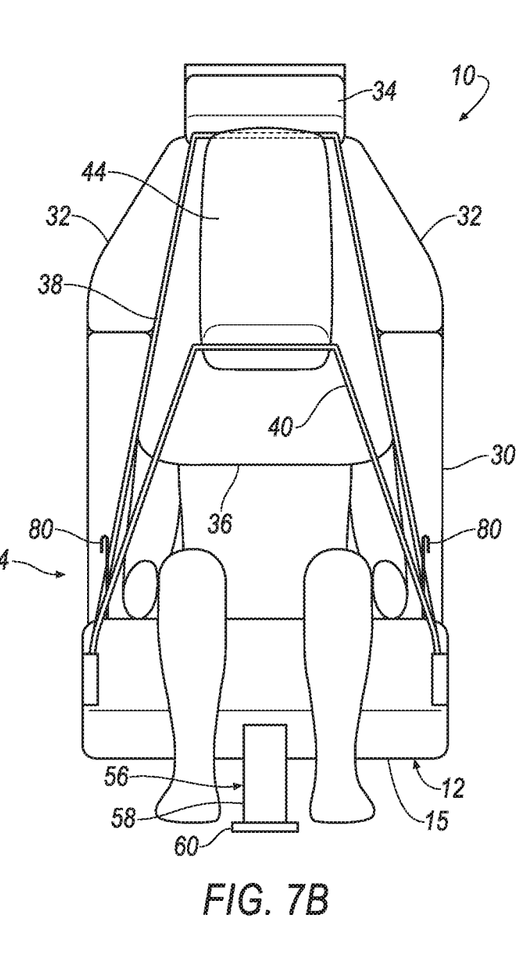
FIG. 7B is a front view of the seat with the airbag assembly of FIG. 2A further inflated relative to FIGS. 6A and 6B.
Figure 8A:
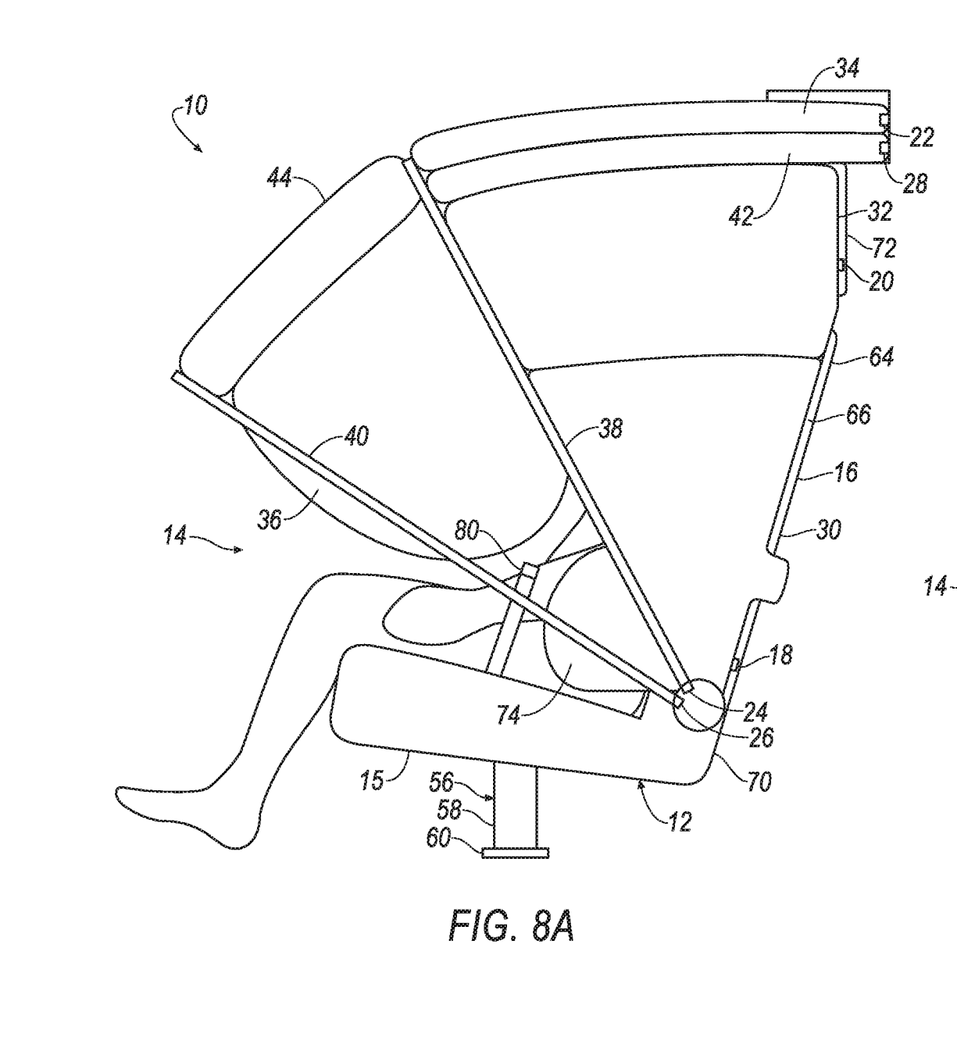
FIG. 8A is a side view of the seat with the airbag assembly of FIG. 2A further inflated relative to FIGS. 7A and 7B.
Figure 8B:
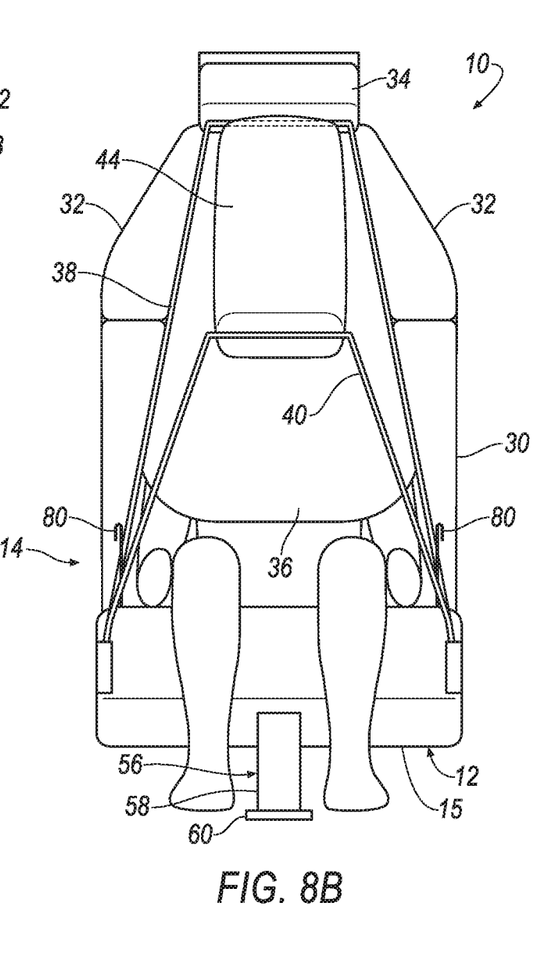
FIG. 8B is a front view of the seat with the airbag assembly of FIG. 2A further inflated relative to FIGS. 7A and 7B.
Figure 9A:
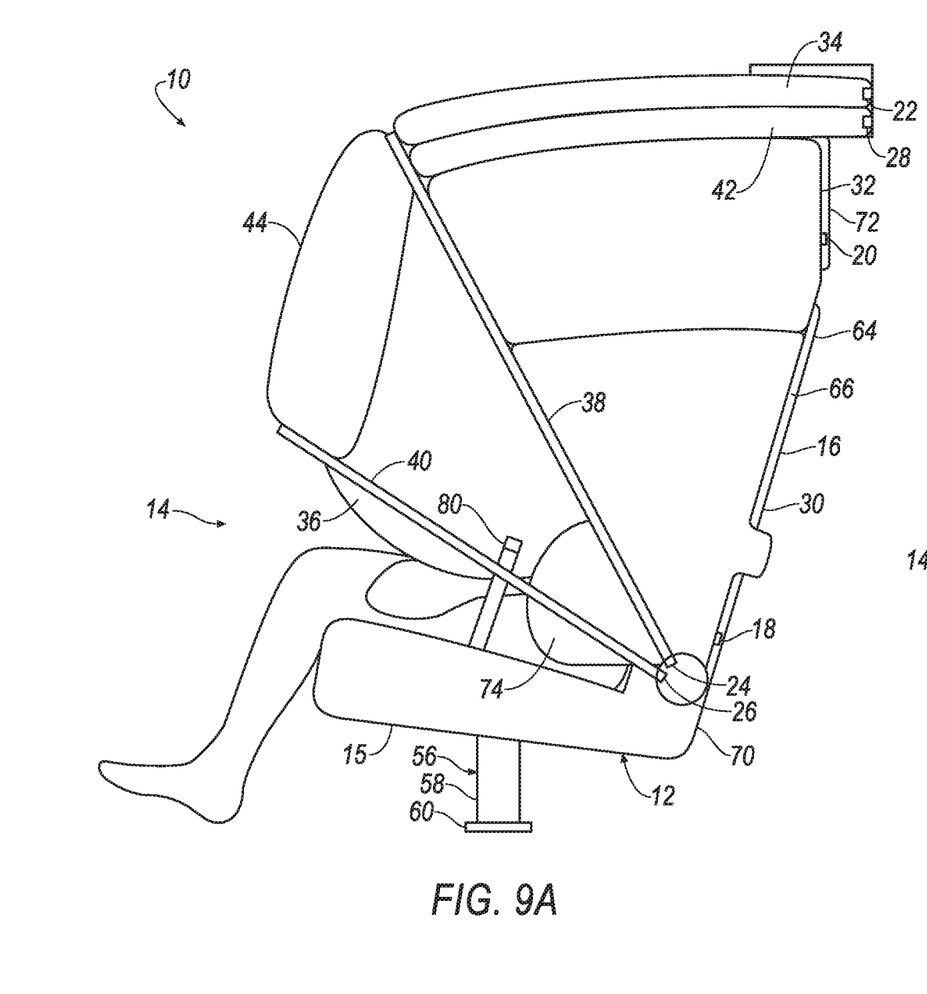
FIG. 9A is a side view of the seat with the airbag assembly of FIG. 2A further inflated relative to FIGS. 8A and 8B.
Figure 9B:
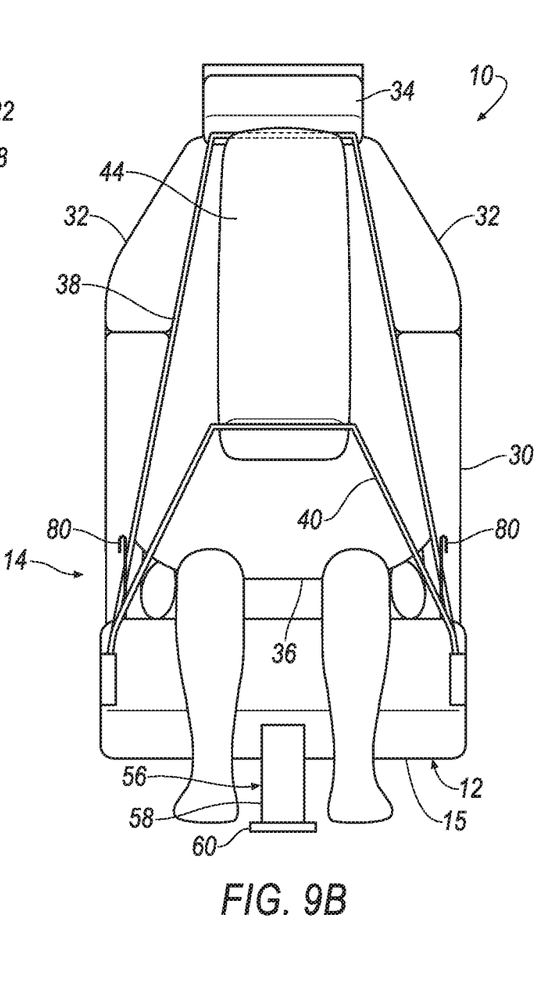
FIG. 9B is a front view of the seat with the airbag assembly of FIG. 2A further inflated relative to FIGS. 8A and 8B.
Figure 10A:
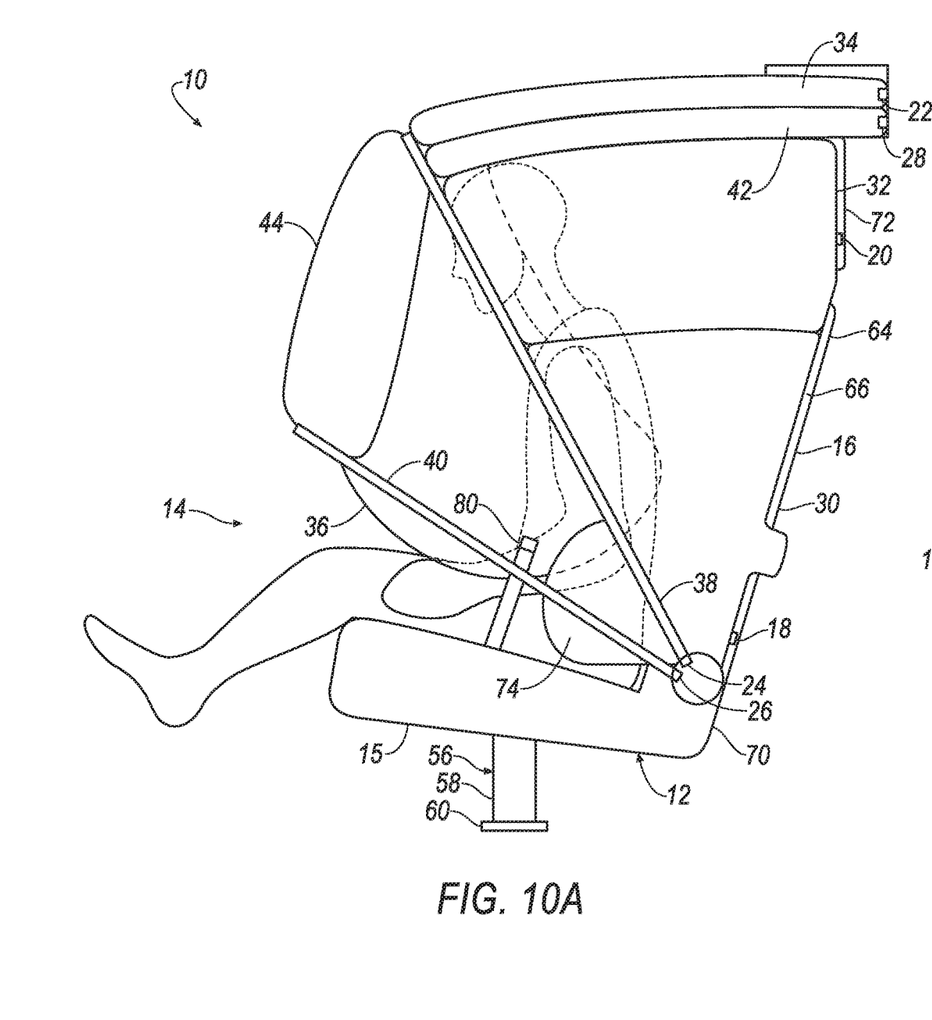
FIG. 10A is a side view of the seat with the airbag assembly of FIG. 2A in a fully inflated position.
Figure 10B:
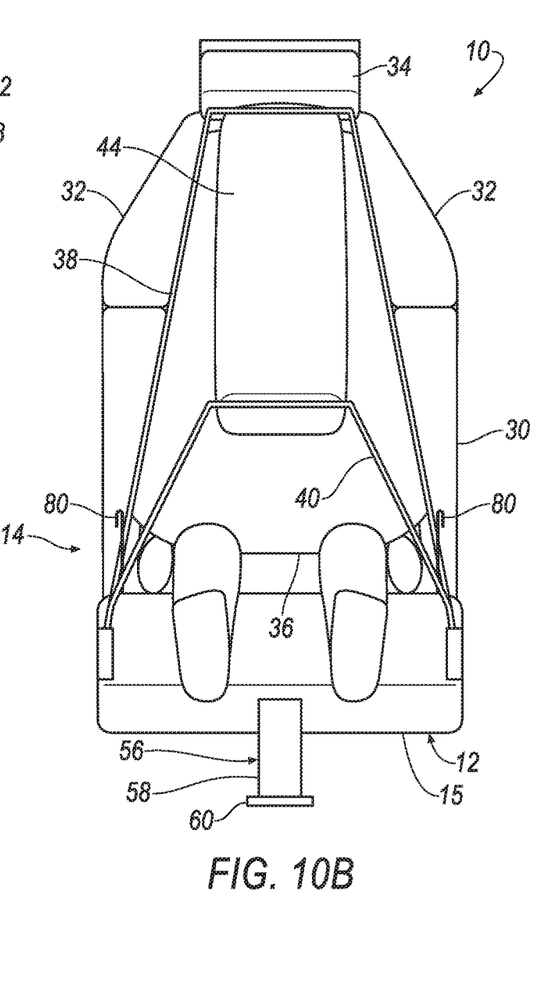
FIG. 10B is a front view of the seat with the airbag assembly of FIG. 2A in the fully inflated position.

The seatback 16 includes a bottom section 70 adjacent the seat bottom 15 and a top section 72 above the bottom, and the front panel 62 extends from the bottom section 70 to the top section 72 positioned to face an occupant. The top section 72 may be a headrest or may be disposed above a headrest.

The inflatable assembly 14 may include a first inflator 18, a second inflator 20, a third inflator 22, a fourth inflator 24, a fifth inflator 26, and a sixth inflator 28 each supported by the seat 12. (The adjectives "first," "second," etc. are used throughout this document as identifiers and are not intended to signify importance or order.) The inflators 18, 20, 22, 24, 26, 28 may be each supported by the seatback 16. The inflators 18, 20, 22, 24, 26, 28 may inflate their respective components, as discussed below, with an inflatable medium, such as a gas. The inflators 18, 20, 22, 24, 26, 28 may be compressed-gas inflators. Alternatively, the inflators 18, 20, 22, 24, 26, 28 may be, for example, pyrotechnic inflators that use a chemical reaction to drive inflation medium to the airbags. The inflators 18, 20, 22, 24, 26, 28 may be, e.g., cold-gas inflators.

The inflatable assembly 14 includes a pair of lower side airbags 30, i.e., a left lower side airbag 30 and a right lower side airbag 30, supported by the seat 12, e.g., the seatback 16. The lower side airbags 30 are supported on opposite sides of the occupant, i.e., the left lower side airbag 30 on the left lateral panel 66 of the seatback 16 and the right lower side airbag 30 on the right lateral panel 68 of the seatback 16. The lower side airbags 30 may each be in fluid communication with the first inflator 18. The first inflator 18 may be a single inflator or may include two separate inflators each dedicated to a respective one of the lower side airbags 30. The lower side airbags 30 are inflatable from an uninflated position to an inflated position. The lower side airbags 30 may each include an extension 74 that extends forward of the rest of the lower side airbag 30 when in the inflated position.

Figure 11A:
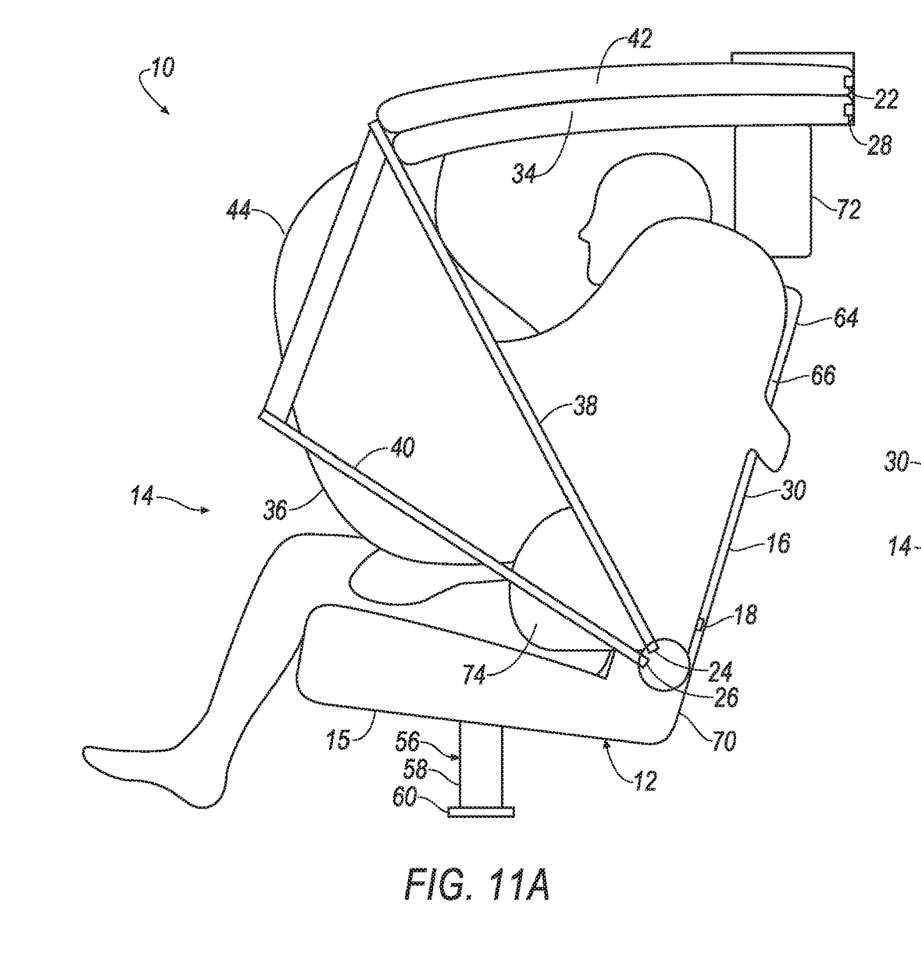
FIG. 11A is a side view of the seat with another example airbag assembly in a fully inflated position.
Figure 11B:
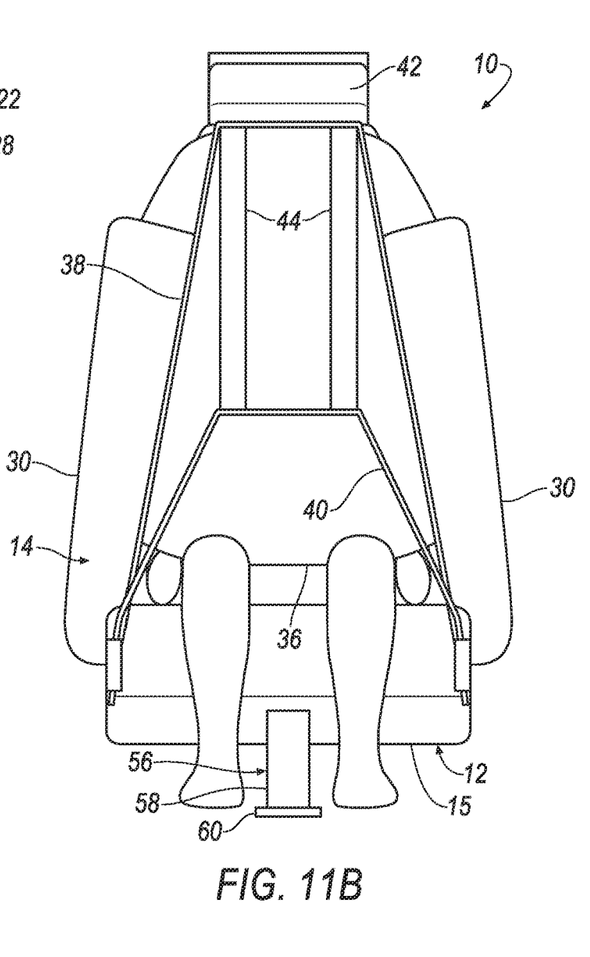
FIG. 11B is a front view of the seat with the airbag assembly of FIG. 11A in the fully inflated position.

The inflatable assembly 14 includes a pair of upper side airbags 32, i.e., a left upper side airbag 32 and a right upper side airbag 32, supported by the seat 12, e.g., the seatback 16. The upper side airbags 32 are disposed above the respective lower side airbags 30. The upper side airbags 32 are supported on opposite sides of the occupant, i.e., the left upper side airbag 32 on the left lateral panel 66 of the seatback and the right upper side airbag 32 on the right lateral panel 68 of the seatback. The upper side airbags 32 may each be in fluid communication with the second inflator 20. The second inflator 20 may be a single inflator or may include two separate inflators each dedicated to a respective one of the upper side airbags 32. The upper side airbags 32 are inflatable from an uninflated position to an inflated position. The upper side airbags 32 may be connected, e.g., sewn, to the respective lower side airbags 30, e.g., by stitching. Alternatively, as shown in FIGS. 11A-B, the lower side airbags 30 may be the only set of side airbags.

The inflatable assembly 14 includes a top airbag 34 supported by the seat 12 at the top section 72 of the seatback 16. The top airbag 34 is in fluid communication with the third inflator 22. The top airbag 34 is inflatable from an uninflated position to an inflated position.

A container 76 is attached to the top airbag 34. The container 76 may be flexible and may be fabric. The container 76 may be a bag.

The inflatable assembly 14 includes a front airbag 36 in fluid communication with the top airbag 34. The front airbag 36 is inflatable in front of the top airbag 34 and the seatback 16. The front airbag 36 and the top airbag 34 may be fluidly connected. The front airbag 36 may be inflatable from the uninflated position downward to the inflated position when the top airbag 34 is in the inflated position. The front airbag 36 in the uninflated position may be disposed in the container 76.

The inflatable assembly 14 includes a first inflatable tether 38 in communication with the fourth inflator 24. The first inflatable tether 38 extends across the front panel 62 of the seatback 16 when inflated. The first inflatable tether 38 extends from the left lateral panel 66 to the right lateral panel 68, below the lower side airbags 30 of the respective lateral panels 66, 68. The first inflatable tether 38 is connected to the pair of lower side airbags 30 and the pair of upper side airbags 32, e.g., by stitching. The connections between the first inflatable tether 38 and the lower side airbags 30 and the upper side airbags 32 are strong enough to resist forward momentum from an occupant who is 50th percentile in stature during an impact test into a fixed barrier at 35 miles per hour. The first inflatable tether 38 may be connected to the top airbag 34. The extension 74 of the lower side airbag 30 may extend forward of the first inflatable tether 38 when both are inflated. The first inflatable tether 38 may be movable from an undeployed position inside the seatback 16 to a deployed position extending across the front panel 62 of the seatback 16.

The inflatable assembly 14 includes a second inflatable tether 40 in communication with the fifth inflator 26. The second inflatable tether 40 extends across the front panel 62 of the seatback 16 when inflated and extends in front of the front airbag 36 when inflated. The second inflatable tether 40 extends from the left lateral panel 66 to the right lateral panel 68. The second inflatable tether 40 may be movable from an undeployed position inside the seatback 16 to a deployed position extending across the front panel 62 of the seatback 16.

The inflatable assembly 14 includes a first inflatable tube 42 supported at the top section 72 of the seatback. The first inflatable tube 42 extends from the top section 72 of the seatback 16 to the first inflatable tether 38. The first inflatable tube 42 is in fluid communication with the sixth inflator 28. The inflatable assembly 14 may include more than one first inflatable tube 42, in which case the sixth inflator 28 may include separate inflators each dedicated to a respective one of the first inflatable tubes 42.

The inflatable assembly 14 includes a second inflatable tube 44 extending from the first inflatable tether 38 to the second inflatable tether 40. The second inflatable tube 44 is in fluid communication with the first inflatable tube 42, i.e., inflation medium flows from the sixth inflator 28, through the first inflatable tube 42, to the second inflatable tube 44. The inflatable assembly 14 may include more than one second inflatable tube 44 connected to one or more first inflatable tube 42.

The first inflatable tether 38 and the second inflatable tether 40 are connected, e.g., sewn together by stitching 78. The stitching 78 may be frangible from inflation of the second inflatable tube 44. When the top airbag 34 inflates, the top airbag 34 exerts a separating force on the first inflatable tether 38 and the second inflatable tether 40, and the separating force is greater than a yielding force of the stitching 78.

The second inflatable tether 40 is engaged by an anchor hook 80 when the second inflatable tube 44 is inflated. A top side of the anchor hook 80 may be angled downward so that the second inflatable tether 40 slides past the anchor hook 80 when moving downward to the deployed position, and a bottom side of the anchor hook 80 may also be angled downward to catch and prevent the second inflatable tether 40 from moving away from the deployed position.

The lateral panels 66, 68 each include a seam 82 extending along the first inflatable tether 38 in the undeployed position. The seams 82 may extend substantially vertically along each lateral panel 66, 68. The portions of the first inflatable tether 38 extending beneath the lateral panels 66, 68 extend substantially parallel to the seams 82. The seams 82 are frangible relative to the rest of the lateral panels 66, 68, i.e., tear or separate at a lower tensile stress than the tensile stress at which the rest of the lateral panel 66, 68 tears or separates. For example, the seams 82 may each be a series of perforations, may each be a line of material thinner than the rest of the lateral panels 66, 68, etc. The seams 82 may be frangible from inflation of the first inflatable tether 38; i.e., the force of inflation of the first inflatable tether 38 may be greater than a yielding force of the seams 82.

The lower side airbags 30 are each in a chute 46, and the chute 46 is rotatably attached to the seat 12. Ends of the first inflatable tether 38 and the second inflatable tether 40 are disposed in the chutes 46. The first inflatable tether 38 and the second inflatable tether 40 are releasably sewn to the seatback 16 and extend from one of the chutes 46 to the top of the seatback 16, and from the top of the seatback 16 to the other of the chutes 46.

Figure 12:
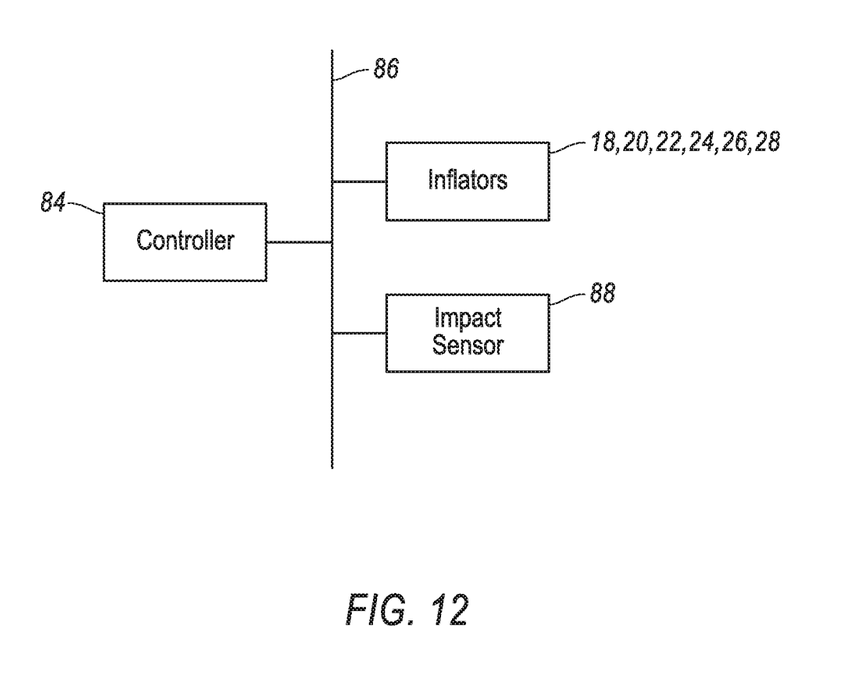
FIG. 12 is a block diagram of a control system for the airbag assembly of FIG. 2A or 11A.

The vehicle 48 may include a controller 84. The controller 84 is a microprocessor-based controller. The controller 84 includes a processor, memory, etc. The memory of the controller 84 includes memory for storing instructions executable by the processor as well as for electronically storing data and/or databases. The controller 84 may be the same computer responsible for operating the vehicle 48 autonomously or semi-autonomously, or the controller 84 may be a different computer. Alternatively or additionally, the controller 84 may be a restraint control module.

The controller 84 may transmit signals through a communications network 86 such as a controller area network (CAN) bus, Ethernet, WiFi, Local Interconnect Network (LIN), onboard diagnostics connector (OBD-II), and/or by any other wired or wireless communications network. The controller 84 may be in communication with an impact sensor 88 and the inflators 18, 20, 22, 24, 26, 28 via the communications network 84. Upon receiving a signal from, e.g., the controller 84, the inflators 18, 20, 22, 24, 26, 28 inflate the airbags The impact sensor 88 is adapted to detect an impact to the vehicle 48. The impact sensor 88 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 88 may be located at numerous points in or on the vehicle 48.

The progression of the inflation of the inflatable assembly is shown in FIGS. 2A-10B. FIGS. 2A and 2B show the inflatable assembly 14 in the uninflated position before detection on an impact. In operation, upon detection of an impact, the impact sensor 88 transmits a signal to the controller 84 via the communications network 86. The controller 84 instructs the sixth inflator 28 to inflate the first inflatable tube 42, which pushes the front airbag 36 and the first and second inflatable tethers 38, 40 forward, as shown in FIGS. 3A-5B. Simultaneously, or subsequently, the controller 84 instructs the fourth inflator 24 and the fifth inflator 26 to inflate the first inflatable tether 38 and the second inflatable tether 40, respectively. The controller 84 instructs the first inflator 18 and the second inflator 20 to respectively inflate the lower side airbags 30 and the upper side airbags 32 simultaneously with, or after, the inflation of the first inflatable tube 42. Subsequently, the controller 84 instructs the third inflator 22 to inflate the top airbag 34. The front airbag 36 is inflated by inflation medium flowing through the top airbag 34 from the third inflator 22. The second inflatable tube 44 inflates from inflation medium flowing through the first inflatable tube 42 from the sixth inflator 28. The second inflatable tube 44 deploys in front of the front airbag 36 to provide a reaction force to the front airbag 36 if impacted by the occupant. The controller 84 is programmed to activate the inflators 18, 20, 22, 24, 26, 28 in the order described above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat assembly comprising:
   a seatback including a left lateral panel and a right lateral panel opposite the left lateral panel;
   an upper left airbag inflatable from the left lateral panel to an inflated position;
   an upper right airbag inflatable from the right lateral panel to an inflated position;
   a tether extending from the left lateral panel to the right lateral panel, the tether connected to the upper left and right airbags;
   a lower left airbag inflatable from the left lateral panel and disposed below the upper left airbag; and
   a lower right airbag inflatable from the right lateral panel and disposed below the upper right airbag.

2. The vehicle seat assembly of claim 1, wherein the tether is attached to the left lateral panel below the upper left airbag and to the right lateral panel below the upper right airbag.

3. The vehicle seat assembly of claim 1, wherein the seatback includes a front panel extending from the left lateral panel to the right lateral panel, and the tether extends across the front panel when the upper left airbag and the upper right airbag are in the inflated position.

4. The vehicle seat assembly of claim 1, wherein the upper left airbag and the lower left airbag are sewn together, and the upper right airbag and the lower right airbag are sewn together.

5. The vehicle seat assembly of claim 1, wherein the tether is connected to the lower left airbag and the lower right airbag.

6. The vehicle seat assembly of claim 1, wherein the seatback includes a top section, the vehicle seat assembly further comprising a top airbag inflatable from the top section forward relative to the seatback.

7. The vehicle seat assembly of claim 6, wherein the tether is connected to the top airbag.

8. The vehicle seat assembly of claim 7, wherein the top airbag is inflatable to an inflated position, the vehicle seat assembly further comprising a front airbag inflatable downward from the top airbag when the top airbag is in the inflated position.

9. The vehicle seat assembly of claim 8, wherein the top airbag is fluidly connected to the front airbag.

10. The vehicle seat assembly of claim 8, further comprising a container connected to one of the top airbag and the tether, wherein the front airbag is inflatable from an uninflated position to an inflated position, and the front airbag in the uninflated position is disposed in the container.

11. The vehicle seat assembly of claim 8, wherein the tether is a first tether, the vehicle seat assembly further comprising a second tether extending from the left lateral panel to the right lateral panel.

12. The vehicle seat assembly of claim 11, further comprising a hook fixed relative to the seatback, wherein the second tether is movable from an undeployed position to a deployed position, and the second tether in the deployed position is engaged with the hook.

13. The vehicle seat assembly of claim 11, wherein the first tether and the second tether are inflatable.

14. The vehicle seat assembly of claim 13, further comprising stitching connecting the first and second tether, the stitching frangible as a result of inflation of the top airbag.

15. The vehicle seat assembly of claim 8, further comprising a front-airbag inflator fluidly connected to the front airbag, at least one lateral-airbag inflator fluidly connected to the upper left airbag and the upper right airbag, and a controller communicatively coupled to the front-airbag inflator and the at least one lateral-airbag inflator, wherein the controller is programmed to instruct the front-airbag inflator to inflate after instructing the at least one lateral-airbag inflator to inflate.

16. The vehicle seat assembly of claim 1, wherein the tether is inflatable.

17. The vehicle seat assembly of claim 16, wherein the left lateral panel and the right lateral panel each include a seam extending along the tether and frangible from inflation of the tether.

18. The vehicle seat assembly of claim 1, further comprising a seat bottom coupled to the seatback, and a rotational mechanism coupled to the seat bottom and connectable to a floor, the rotational mechanism rotatable about an axis transverse to the floor.

19. A vehicle seat assembly comprising:

a seatback including a left lateral panel, a right lateral panel opposite the left lateral panel, and a top section;

a left airbag inflatable from the left lateral panel to an inflated position;

a right airbag inflatable from the right lateral panel to an inflated position;

a top airbag inflatable from the top section forward relative to the seatback to an inflated position;

a first tether extending from the left lateral panel to the right lateral panel, the first tether connected to the left and right airbags and to the top airbag;

a front airbag inflatable downward from the top airbag when the top airbag is in the inflated position; and a second tether extending from the left lateral panel to the right lateral panel.

20. A vehicle seat assembly comprising:

a seatback including a left lateral panel, a right lateral panel opposite the left lateral panel, and a top section;

a left airbag inflatable from the left lateral panel to an inflated position;

a right airbag inflatable from the right lateral panel to an inflated position;

a top airbag inflatable from the top section forward relative to the seatback to an inflated position;

a tether extending from the left lateral panel to the right lateral panel, the tether connected to the left and right airbags and to the top airbag;

a front airbag inflatable downward from the top airbag when the top airbag is in the inflated position;

a front-airbag inflator fluidly connected to the front airbag;

at least one lateral-airbag inflator fluidly connected to the left airbag and the right airbag; and a controller communicatively coupled to the front-airbag inflator and the at least one lateral-airbag inflator, wherein the controller is programmed to instruct the front-airbag inflator to inflate after instructing the at least one lateral-airbag inflator to inflate.

* * * * *